United States Patent [19]

Keyser et al.

[11] Patent Number: 4,844,852
[45] Date of Patent: Jul. 4, 1989

[54] METHOD AND APPARATUS FOR SEVERING THREE DIMENSIONAL THERMOPLASTIC ARTICLES

[75] Inventors: Stephen R. Keyser, Canadaigua; David Vadney, Macedon, both of N.Y.

[73] Assignee: Mobil Oil Corporation, New York, N.Y.

[21] Appl. No.: 127,343

[22] Filed: Dec. 1, 1987

[51] Int. Cl.⁴ .................... B26D 5/20; B29C 51/00
[52] U.S. Cl. ...................... 264/153; 83/36; 83/206; 83/268; 264/544; 425/302.1; 425/397
[58] Field of Search ...................... 83/33–36, 83/214, 253, 268, 228, 278, 387, 418–421, 444, 446, 925 R, 206; 264/145, 153, 160, 544; 425/296, 302.1, 304, 315, 397

[56] References Cited

U.S. PATENT DOCUMENTS

| | | | |
|---|---|---|---|
| 430,914 | 2/1884 | Keim | 83/35 |
| 3,240,851 | 3/1966 | Scalora | 264/153 |
| 3,461,756 | 8/1969 | Mojonnier | 83/17 |
| 3,502,761 | 3/1970 | Dimitracopoulos | 264/153 |
| 3,518,334 | 6/1970 | Carrigan et al. | 264/89 |
| 3,523,474 | 8/1970 | Kinslow, Jr. | 83/40 |
| 3,564,655 | 2/1971 | Smith | 425/397 |
| 3,656,381 | 4/1972 | Gilev et al. | 83/133 |
| 3,679,803 | 7/1972 | Palencher | 425/397 |
| 3,785,762 | 1/1974 | Butzko | 425/289 |
| 3,808,927 | 5/1974 | Neil | 83/228 |
| 3,924,499 | 12/1975 | Dechambre et al. | 83/278 |
| 4,381,278 | 4/1983 | Ingraffea | 264/550 |
| 4,477,243 | 10/1984 | Wallsten | 425/292 |
| 4,624,162 | 11/1986 | Arnold | 83/74 |

OTHER PUBLICATIONS

*Die Design and Diemaking Practice;* The Industrial Press, New York City, 1951, p. 196.

Primary Examiner—Jan H. Silbaugh
Assistant Examiner—Jill L. Heitbrink
Attorney, Agent, or Firm—Alexander J. McKillip; Charles J. Speciale

[57] ABSTRACT

Method and apparatus for forming a web of uncut thermoplastic articles from a sheet of material and severing the uncut articles from the web of unseparated articles by precisely locating the unseparated articles with respect to a cutting tool and, once located, cutting the product from the web. Male locating pins included as part of the trimmer and spaced a known distance from the cutting edge move forward to engage web deformations. The forward movement of the male locating pin delivers sufficient force to the deformations to center them on the male locating pin. Continued forward movement forces the other side of the deformation into contact with a female locating pin included as part of the die and spaced the same known distance from the die edge. The female locating pin grabs the deformation to place the sheet in the desired location. Once the article has been precisely located with respect to the cutting edge, the sheet of uncut articles is pressed against the die face and the articles are cut from the sheet.

26 Claims, 4 Drawing Sheets

METHOD AND APPARATUS FOR SEVERING THREE DIMENSIONAL THERMOPLASTIC ARTICLES

BACKGROUND OF THE IVNENTION

1. Field of the Invention:

This invention relates to a method and apparatus for severing formed articles from a sheet or web of thermoplastic material. More specifically, this invention relates to a method and apparatus for precisely locating an uncut thermoformed part by engaging small projections formed in the skeleton or scrap portion of the web using retractable male and female locators included as part of the punch and die respectively to precisely position the uncut article prior to severing.

2. Description of the Prior Art:

Methods and apparatus for forming uncut articles in a sheet or web of thermoplastic material are well known. Typically, a web of a thermoplastic material such as polystyrene is fed from a supply roll, through a preheating zone to give the material a suitable temperature for the forming process, and to a forming zone where a forming tool is used to form the article in the web. After cooling, the web of uncut articles are carried to a stamping tool which cuts the formed article out of the web. The various apparatus which may be used to form and trim such articles are extensive. For example, U.S. Pat. No. 3,518,334 to Carrigan et al and U.S. Pat. No. 4,477,243 to Wallsten both disclose apparatus for forming articles in a web of thermoplastic material.

Once formed, the uncut article should be carefully cut from the thermoplastic web with care and precision. Inaccurate trimming procedures may result in various undesirable results such as excess material at the edges of the cut article or destruction of the article during the severing process. Additionally, the method of locating and severing the formed articles must be consistent with industry needs to maintain high production rates.

Various methods and apparatus for advancing the web of formed articles and for severing the formed article from the web of thermoplastic material are known. Several of these methods include the use of projections on the web for aiding the advancing or severing of the formed articles. For example, the above-cited patent to Wallsten acknowledges that the production of projections on the sheet material during the forming operation is old in the art. Wallsten preferably utilizes the projections along the edges of the sheet to push or pull the sheet to the trim press for cutting. A gripping means utilizes the projections to supply the web to the stamping means. Wallsten is silent, however, with respect to the utilization of any such gripping means or projections for precisely locating the uncut articles prior to stamping. See also U.S. Pat. No. 3,785,762 issued to Butzko et al.

U.S. Pat. No. 4,430,914 issued to Keim discloses a rotary apparatus for advancing a web or formed thermoplastic articles. In Keim, rotary advancing means directly engage the web at spaced locations across the width of the web. A repeat indexing movement advances the web to the trimming station. The indexing movement is controlled by drive means which periodically rotates the advancing means to produce the aforementioned indexing movement. Release means periodically release the engagement of the rotary advancing means with the web to enable relaxation of stress developed in the web and to allow the interaction of the web and the guide means in the absence of constraint by the rotary advancing means.

The use of locating pins to precisely locate uncut articles with respect to the cutting or stamping apparatus are not as common in thermoplastic article severing applications. The use of such locatang pins are, however, are much more well known in metal stamping applications for die making or other punching processes. For example, Jones, Franklin, *Die Desion and Diemaking Practice,* The Industrial press, 1930, page 196 discloses a guide pin which aligns a metal blank with a die cut by insertion into a pierced hole in the metal blank. Similar processes may be seen by reference to U.S. Pat. No. 4,624,162 issued to Arnold which discloses a punch press for punching a series of openings in a strip of sheet metal stock. An opening in the sheet is used for positioning the sheet so that the strip is properly positioned for a punch operation. The punch press includes a pilot punch which penetrates an opening in the strip previously pierced by a pierce punch and is received in a opening in the second face of the punch for adjusting the positioning of the stock strip prior to the next punch operation.

U.S. Pat. No. 3,656,381 issued to Gilev et al discloses a punch press for punching sheet members from circular blanks. In the center of the punch press is a pin for centering the blank relative to the female die. The pin diameter corresponds to the size of the central opening of the blank fed into the die. The punching process transforms the blank into a rotor lamination for an induction motor.

U.S. Pat. No. 3,502,761 issued to Dimitracopoulos discloses the utilization of locating holes in either in the center of the product or spaced around the product in the web. In Dimitracopoulos, a piercing die penetrates the web to form a hole. A locating pin passes through the formed hole and mates with an opening in the second face to align the sheet prior to cutting a disc from the web.

The application of such processes for locating thermoplastic articles prior to severing have been much less successful. Such processes, which generally include the capture of a hole in a sheet for locating the sheet prior to stamping, are often unsuitable for thermoplastic operations. Thermoplastic sheets are much less stronger and would be less likely to withstand pressure exerted on the sheet by a locator without damage. Furthermore, thermoplastic applications often requires precise trimming of a pre-formed article from a web not required in many sheet metal stamping processes.

Despite such problems, limited applications of the use of projecting members in thermoplastic trimming apparatus where the projecting members engage the articles themselves are known. Such methods often rely on projecting members of dimensions close to the size of the articles themselves and on uniquely shaped articles which afford surfaces for easy engagement with the projecting member, e.g. cup-shaped articles. Other such applications utilize web materials or operating conditions which permit the projecting member to reshape the uncut articles prior to separation. For example, U.S. Pat. No. 3,461,756 issued to Mojonnier discloses a method for trimming plastic preforms from a sheet of plastic where the side walls of the preform are engaged between inner and outer shaping members to conform the preform to the preselected shape of the shaping member. Relative movement between the shaping members and a trim die while the shaping members are maintained in engagement with the preform punches the preform from the web of plastic material. U.S. Pat. No. 3,240,851 issued to Scalora discloses a method and apparatus for severing a cup-like article of thermoplastic material where a guide engages the inside of the formed article to center it normal to the sheet and make the sheet taut across a back-up member sized to encircle the formed article.

U.S. Pat. No. 3,523,474 issued to Kinslow discloses a method for trimming thermoformed parts by drawing a vacuum between the objects and a punch member to position the object on the punch prior to shearing the object from the sheet. The punch includes a protrusion inside the periphery of the cutting edge which interacts with a similarly shaped deformation on the periphery of the product. Suction draws the object to fit over the protrusion to closely align the punch and the object. Kinslow does not suggest, however, the use of a female protrusion in the aligning the object.

Also known in the art is the use of spring loaded male locators in combination with a punch for locating thermoplastic articles prior to cutting them from a web. The articles are formed with two small, narrow tip cone-shaped protrusions spaced on the inner sides of the outer four articles of a five article trim shot. The male locators positioned the web protrusions in complementary shaped female openings in the die face to locate the articles with respect to the cutting edge of the punch.

SUMMARY OF THE INVENTION

It is an object of this invention to provide a method and apparatus for trimming a plurality of thermoformed articles which are connected to each other by a surrounding web.

It is another object of this invention to provide a method and apparatus for precisely locating uncut thermoformed articles prior to severing the articles from the surrounding web.

It is yet another object of this invention to provide a method and apparatus for precisely locating uncut thermoformed articles using spring-loaded male and female locators having complementary geometry.

It is still yet another object of this invention to provide male and female locating members to engage opposite sides of complementary shaped deformations in the web to align the uncut articles prior to trimming.

It is still yet another object of this invention to provide a method and apparatus for the self-alignment of the web of uncut articles on locating members prior to trimming the articles from the web.

It is still yet another object of this invention to provide an improved web design to facilitate the location of the uncut articles with respect to the cutting edge of the die face.

It is still yet another object of this invention to improve utilization of thermoplastic material by reducing the amount of trim material surrounding a thermoplastic article cut from a web of the material.

In accordance with the objects and principles of this invention, an apparatus and method of forming a web of uncut thermoplastic articles from a sheet of material and severing the uncut articles from the web of unseparated articles by precisely locating the unseparated articles with respect to a cutting tool and, once located, cutting the product from the web is hereby disclosed.

A sheet of material is supplied to a former where a web comprising a series of articles surrounded by projecting deformations in a known spaced relationship to the edges of the articles is formed. The projections are designed both for easy forming and for improved aligning capabilities. Once formed, the web of uncut articles is supplied to a cutting or trimming apparatus for severing the articles from the web. The uncut articles are approximately located with respect to the cutting edges of the cutting apparatus by a paddle which engages the web and, by advancing the web a specified distance, approximately locates the uncut articles with respect to the cutting edges.

Once the uncut articles are approximately located with respect to the cutting edges, retractable, spring loaded, male locating pins identically orientated with respect to the cutting edges as the projecting deformations to the edges of the uncut articles move forward and engage the inner sides of the projecting web deformations. The forward movement of the male locating pins delivers sufficient force to the projecting deformations to center them on the male locating pins. Continued forward movement forces the outer sides of the projecting deformations into contact with retractable, spring loaded, female locating pins identically orientated with respect to the edges of the die face as the projecting deformations to the edges of the uncut articles. The complementary shapes of the second side of the projecting deformations and the female locating pins allow the female pins to grab the projecting deformations. The sheet becomes aligned in the desired location such that the cutting edges of the punch, the edges of the articles and the edges of the die face are aligned precisely.

Once the article has been precisely located with respect to the cutting edges, the sheet of uncut articles is pressed against the die face and the articles are cut from the sheet. The cut articles accumulate in proximity to the die to form a log of cut products.

The above and other objects, advantages and features of the invention will be more readily understood from the following detailed description of the invention, which is provided in connection with the accompanying drawings.

DESCRIPTION OF THE PREFERRED EMBODIMENT

Figure 1:
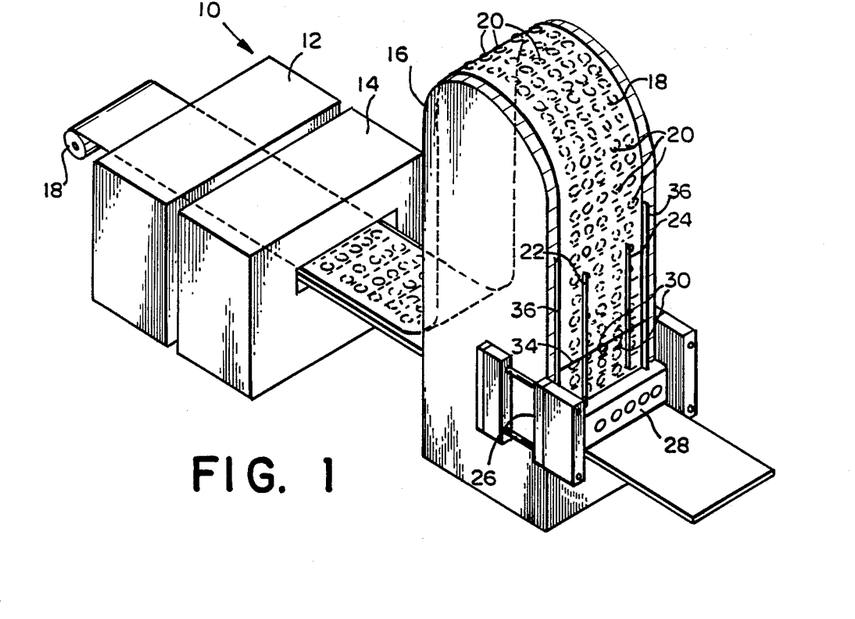
FIG. 1 is a perspective view of a thermoforming line which includes a trimming station in accordance with the present invention.

Turning first to FIG. 1, there is shown a thermoforming apparatus 10, comprising a preheating oven 12, forming station 14, and trimming station 16 for producing articles, e.g. disposable tableware products such as dinner plates, from a continuous web 18 of thermoformable material such as polystyrene.

Web 18 is advanced through oven 12 where it is heated to a temperature suitable for thermoforming, and into forming press 14 where identical articles 20 are periodically formed in the web. While it is contemplated that numerous types and sizes of identical articles may be formed by press 14, as well as any number of identical articles may be simultaneously formed, one example of identical article which has been manufactured successfully in conjunction with this invention is dinner plates appoximately 6" in diameter, formed simultaneously in rows of five articles. The press also simultaneously forms a plurality of projecting deformations (not shown in FIG. 1) in the trim skeleton portion of the web which is the portion of the web not formed into identical articles 20. Such projecting deformations are spaced in regular locations with respect to identical articles 20. For the specific example of 5 articles per row for simultaneously forming, it has been learned that 4 projecting deformations regularly spaced around each formed article yields satisfactory results. While it is entirely contemplated that the shape, size and spacing of the deformations may be varied according to the particular application of the invention, it is preferred that the projecting deformations should be cone-shaped with a wide tip for improved forming and locating results. Again for the example discussed above, it has been found that cone-shaped deformations of diameter 0.560" at the base and height 0.425" will provide the desired results.

Web 18 is advanced to trimming station 16 by any one of numerous methods well known in the art where it is guided by web alignment guide bars 22 and 24 (which terminate before the die 28) towards movable ram or punch 26 and stationary trim die 28. As the web 18 approaches the ram 26 and die 28, feed paddles 30 stroke up and down, grabbing the web 18 and advancing the web in indexing strokes to place web 18 between movable punch 26 and stationary trim die 28.

Figure 2:
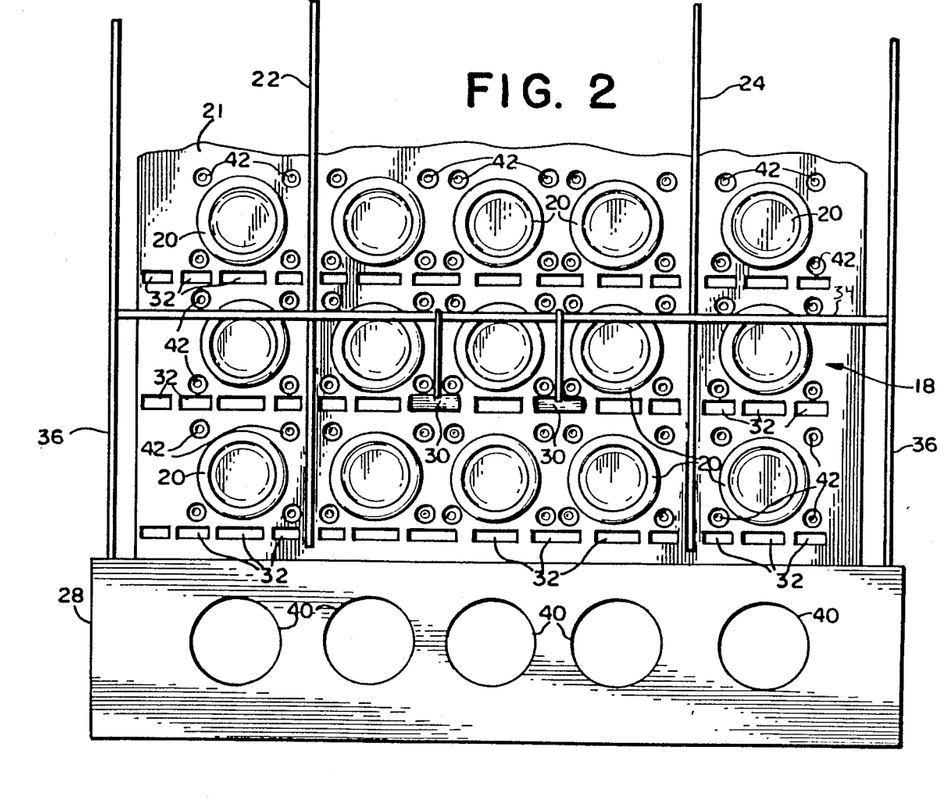
FIG. 2 is a front view of the trimming station of FIG. 1.

Turning next to FIG. 2, the indexing of the formed sheet of uncut articles to the punch and die may be better seen. Web 18, which is advanced to the feed paddles 30 by conventional means, is, in one embodiment of the invention, provided with rows of rectangular feed buttons 32 placed between each row of uncut articles 20. Preferably, feed buttons 32 are placed between the projecting deformations 42 associated with successive rows of uncut articles 20. Once web 18 is advanced to feed paddles 30, feed paddles 30 push against the side of the feed button 32 to index the web 18 downward. To do so, feed paddles 30 stroke up and down to index formed articles 20 of web 18 to the punch 26 (not seen in FIG. 2) and die 28. The indexing movement of the paddles 30 is provided by the rotation of pivoting arm 34. Pivoting arm 34 may be rotated by any one of numerous rotating means 36 such as an electric motor of conventional design with a turning shaft connected to pivoting arm 34. The precise apparatus and method used to rotate pivoting arm 34 is not essential to the practice of the present invention. Furthermore, while the use of feed paddles 30 and feed buttons 32 is one method to index unsevered articles 20 to the punch and die, it is contemplated that numerous other methods to index the articles to the die may be utilized instead.

Figure 3:
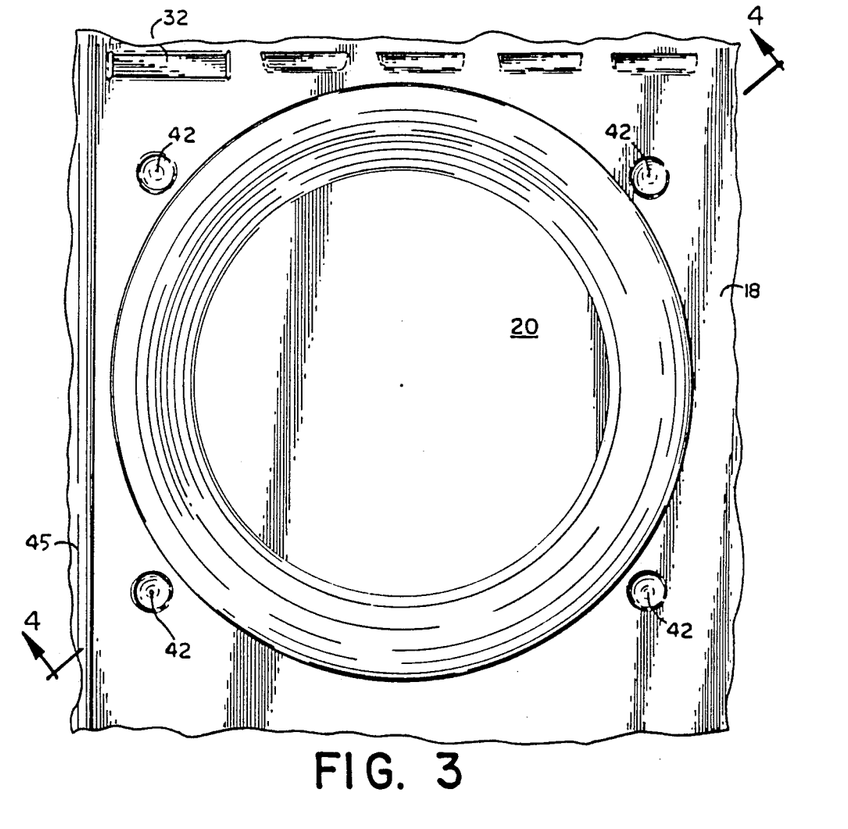
FIG. 3 is a top view of a portion of the web of uncut thermoplastic articles to be severed by the trimming station of FIGS. 1 and 2.
Figure 4:
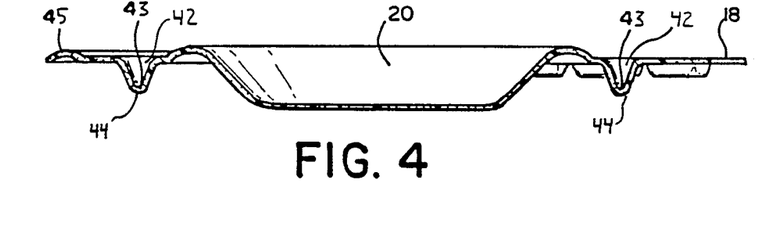
FIG. 4 is a cross-sectional view along line 4—4 of FIG. 3.

Turning next to FIG. 3 and 4, the web 18 of unsevered articles 20 may be more clearly described. Web 18 includes a plurality of unsevered articles 20 surrounded by projecting deformations 42, preferably cone-shaped projecting deformations. For purposes of providing a clear description of the method of the present invention, the inside 43 of projecting deformations 42 shall be the side for which the web 18 is indented and the outside 44 of projecting deformations 42 shall be the side where the deformation is projecting. The web 18 also has feed buttons 32 and guide bar deformations 45. Feed buttons 32, which as previously described, are used to index the uncut articles 20 into approximate alignment with the punch and die, project in the same direction as the projecting deformations 42. Guide bar deformations 45, which project in the opposite direction of projecting deformations 42, engage guide bars 24 to facilitate the advancing of web 18 to the punch and die. While any number of guide bar deformations 45 (and corresponding guide bars 24 which may be seen with reference to FIG. 2) may be utilized in the practice of the present invention, the example described herein utilizes two guide bars 24 and corresponding guide bar deformations 45 to aid the advancing of web 18 to the punch die. In one embodiment of the invention, however, it is contemplated that the guide bar deformations 45 are eliminated from web 18 to facilitate the self-alignment of web 18 in the trim press.

Figure 5:
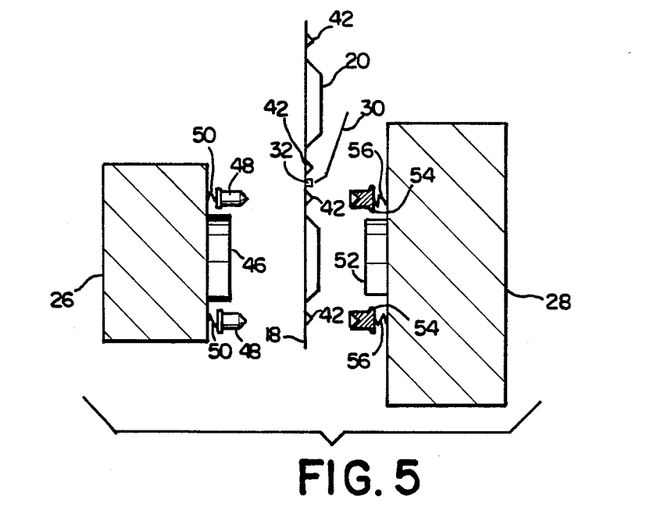
FIG. 5 is a diagrammatic side view of the trimming station of FIGS. 1 and 2.

Turning next to FIG. 5, the precise locating of uncut thermoplastic articles to a cutting edge and severing of such articles from the web which is the subject of the present invention is now described. The major parts of the trimming apparatus shown in FIG. 5 are the punch press 26 and a trim die 28.

Punch press 26 includes a plural number of cutting edges 46, the number of which correspond to the number of articles 20 included in a row of web 18. Typically cutting edges 46 will be blades shaped in the form of the articles 20 to be severed from web 18. Each cutting edge 46 is surrounded by a plurality of male locating pins 48 which project beyond their corresponding cutting edge 46. The male locating pins 48 are provided with springs 50 to permit the male locating pins 48 to retract during the trimming operation. The cutting edges 46 and male locating pins 48 are spaced on punch 26 similar to the spacing of uncut articles 20 and cones 42 on web 18.

Trim die 28 includes a plural number of die openings 52, the number of which correspond to the number of articles 20 included in a row of web 18. Typically, die openings 52 will be circular openings of diameter approximately equivalent to the product being severed from web 18. While a typical die opening will be a hollowed out opening flush with and extending through die 28, for ease of representation die openings 52 are shown in FIG. 5 as a circular extension of die 28. Each die opening 52 is surrounded by a plurality of female locating pins 54 which project beyond die 28. The female locating pins 54 are provided with springs 56 to permit the female locating pins 54 to retract during the trimming operation. The die openings 52 and female locating pins 54 are spaced on die 28 similar to the spacing of uncut articles 20 and cones 42 on web 18. As the punch 26 severs articles 20 from the web, articles 29 are pushed into die opening 52 for stacking of articles 20 into logs of severed articles.

Figure 6:
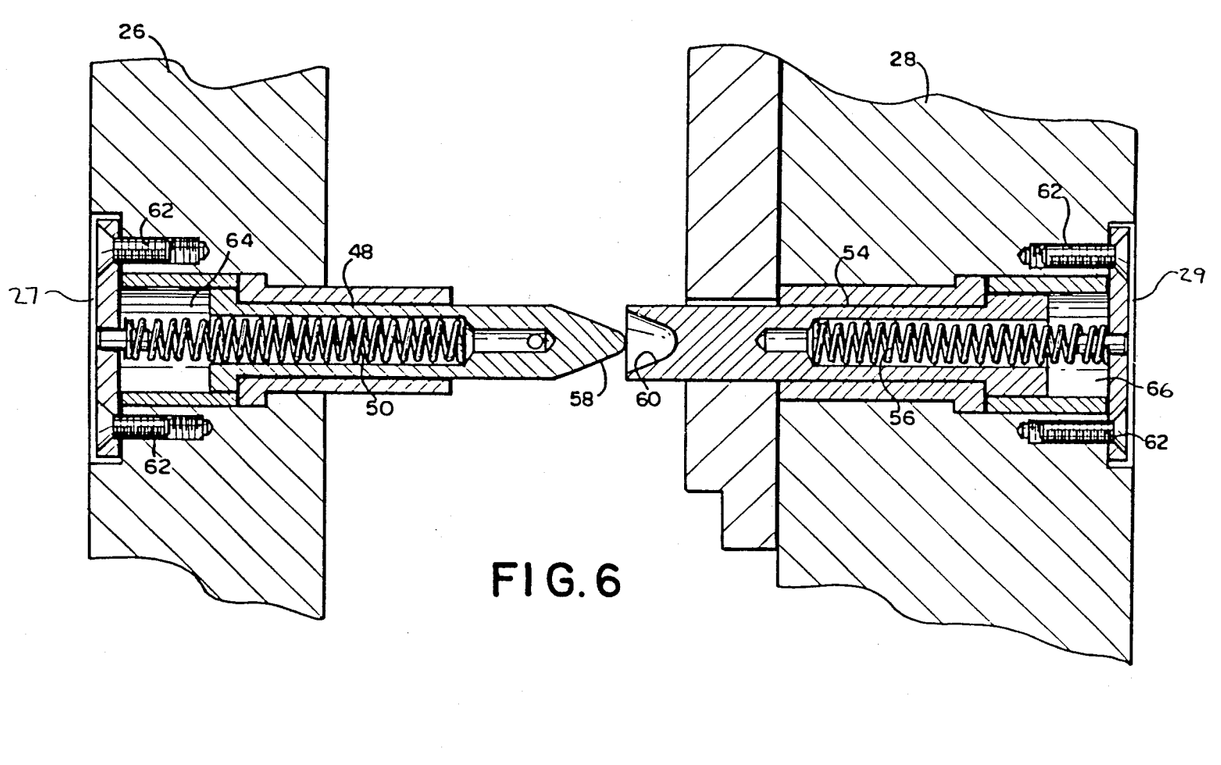
FIG. 6 is cross-sectional view of the male and female locating pins of FIG. 5.

Turning next to FIG. 6, the male locating pins 48 of punch 26 and the female locating pin 54 of die 28 may now be described. Male locating pin 48 and female locating pin 54 are installed in corresponding openings 27 and 29 of punch 26 and die 28 respectively where they are secured to punch 26 or die 28 by bolts 62. Male locating pin 48 is also provided with central opening 64 so that upon advancement of the punch 26 so that cutting edges 46 can sever articles 20, the male locating pin 48 may retract to avoid damage to the web which would be caused by a non-retractable male locating pin. Male locating pin is also provided with a projecting tip 58 sized to easily fit within a cone-shaped projecting deformation 42 of web 18.

Similarly, female locating pin 54 is provided with a central opening 66 so that as the punch 26 drives web 18 into die openings 52, the female locating pin 54 may retract to allow the pressing of the articles 20 into the die openings 52 without damage to the web which would be caused by a non-retractable female locating pin. Female locating pin 54 is further provided with a hollowed out tip 60 which is sized to easily receive a cone-shaped projecting deformation 42 of web 18.

The method of severing uncut articles 20 from web 18 using the novel punch 26 and trim die 28 of the present invention is now described by reference to both FIGS. 5 and 6. After the indexing of web 18 by the interaction of paddle pusher 30 and feed buttons 32 to approximately locate articles to cutting edges 46 and die openings 52, the paddle pusher 30 retracts to avoid interference in the severing process to be immediately described.

Punch 26 approaches web 18 to begin separation of articles 20 from the web. For example, punch 26 may include a ram portion which will drive the punch forward towards web 18. As the articles 20 are approximately aligned with cutting edges 46 of punch 26, the projecting deformations 42 will also be approximately aligned with locating pins 48 and 54 of the punch 26 and die 28 respectively. As the punch 26 approaches web 18, the projecting tips 58 of male locating pins 48 engage the inside 43 of an associated projecting deformation 42 of web 18. As the projecting deformations 42 and male locating pins 48 are not precisely aligned, engagement may occur at any point along the inside 43 of projecting deformation 42.

As the web is, at this point, not held by either the punch 26 or trim die 28, the engagement of the male locating pin 48 and projecting deformation 42 of web 18 will push web 18 towards the trim die 28, die edges 52 and female locating pins 54. Again, as the articles 20 and the die edges 52 are still only approximately aligned, the point of first contact between web 18 and trim die 28 shall be somewhere along hollowed out tip 60 of the female locating pin 54 which is approximately aligned with projecting deformation 42.

Projecting deformations 42 will engage the hollowed out tip 60 of the aligned female locating pin 54. The interaction between the projecting deformations 42 and the male and female locating pins 48, 54 will result in article 20 being precisely aligned between a cutting edge 46 and a die edge 52. Continued displacement of punch 26 will drive web 18 towards die edge 52. until the edges of the uncut articles 20 are pressed between cutting edges 46 and die edges 52. The engagement of the cutting edges 46 and die edges 52 with the uncut articles 20 is permitted by the retraction of the spring loaded male and female locating pins 48 and 54 in openings 64 and 66 respectively. Retraction of the locating pins occurs because as the punch 26 continues to advance towards the die 28, the projecting tip 58 of male locating pin 48 is fully engaged with the complementary, hollowed out tip 60 of female locating pin 54. Continued forward movement of punch 26 towards die 28 exerts force against the female locating pin 54 which compresses spring 56 and forces the female locating pin 54 to retract into opening 66 and, in turn, the resistance of spring 56 to compression exerts a reverse force upon male locating pin 48 which compresses spring 50 and forces male locating pin into opening 64.

Continued forward movement of punch 26 towards die 28 drives the edges of articles 20 into engagement with die edges 52. Cutting edges 46 then engage the edges of uncut articles 20 to sever articles 20 from web 18 and push articles 20 through die openings 40. After severing a row of articles 20 from web 18, punch 26 retracts to release the web 18 and permit the male and female locating pins 48, 54 to return to their original position. A next row of uncut articles 20 are then indexed into approximate alignment with the punch 26 and die 28 by paddle pusher 30 and the severing process repeats. Repeated severings of articles 20 from the web stacks the severed articles into in accumulations of large numbers of the severed products into logs of the severed articles 20 for removal and use.

Thus, there has been described and illustrated herein methods and apparatus for precisely locating uncut articles formed on a web of thermoplastic material to the cutting edges of a punch and trim die. Once located, the uncut articles are severed from the web. However those skilled in the art will recognize that many modifications and variations besides those specifically set forth may be made in the techniques described herein without departing substantially from the concept of the present invention. Accordingly, it should be clearly understood that the form of the invention described herein is exemplary only, and is not intended as a limitation on the scope of the claims.

What is claimed is:

1. A method for severing uncut thermoplastic articles formed on a sheet of material comprising the steps of:
   thermoforming a web of uncut thermoplastic articles and deformations from said sheet of material, said formed web consisting of a plurality of uncut thermoplastic articles and a plurality of projecting deformations surrounding said uncut thermoplastic articles;
   supplying said web of uncut thermoplastic articles to a trimming apparatus which comprises a movable punch portion in an original position and a die portion, said movable punch portion including at least one retractable male locating pin and at least one cutting edge, said die portion including at least one retractable female locating pin and at least one die opening;
   approximately aligning said thermoplastic articles with said cutting edges of said movable punch portion and said edges of said die portion;
   engaging said projecting deformations of said web between said male and female locating pins to precisely align said edge of said thermoplastic articles with said at least one cutting edge of said movable punch portion and said at least one die opening prior to engagement of said web with said at least one cutting edge and said at least one die opening; and
   severing said thermoplastic articles from said web;
   wherein said male and female locating pins retract during said severing step to permit engagement of said articles with said at least one cutting edge and said at least one die opening.

2. The method of claim 1 wherein said thermoforming step further includes forming a plurality of feed buttons on said web and wherein said aligning step further includes the steps of:
　engaging said feed buttons on said web; and
　indexing said web a specified distance to align said articles with said cutting edges and said die edges.

3. The method of claim 2 further comprising the step of rotating a paddle engaged with said feed buttons to index said web.

4. The method of claim 1 further comprising the steps of:
　driving said at least one male locating pin into contact with an inner side of said projecting deformations;
　exerting force on said inner side of said projecting deformations to drive an outer side of said projecting deformations into contact with said at least one female locating pin;
　aligning said articles between said male and female locating pins; and
　severing said articles from said web with said cutting edges.

5. The method of claim 4 further comprising the steps of:
　driving said aligned articles into contact with said die portion;
　retracting said male and female locating pins a distance sufficient to allow said cutting edges to contact said aligned articles.

6. The method of claim 5 further comprising the steps of:
　releasing said engagement of said male and female locating pins and said projecting deformations;
　returning said punch portion to said original position;
　aligning at least one next article with said cutting edges of said punch portion and said die edges of said die portion.

7. The method of claim 1 wherein said thermoforming step further includes forming at least one guide bar deformation on said web and wherein said supplying step further includes the steps of:
　engaging said at least one guide bar deformation; and
　guiding said web towards said trimming apparatus.

8. The method of claim 7 wherein said thermoforming step further includes forming a plurality of feed buttons on said web and wherein said aligning step further includes the steps of:
　engaging said feed buttons on said web; and
　indexing said web a specified distance to align said articles with said cutting edges and said die edges.

9. The method of claim 8 further comprising the steps
　driving said at least one male locating pin into contact with an inner side of said projecting deformations;
　exerting force on said inner side of said projecting deformations to drive an outer side of said projecting deformations into contact with said at least one female locating pins;
　aligning said articles between said male and female locating pins; and
　severing said articles from said web with said cutting edges.

10. The method of claim 9 further comprising the steps of:
　driving said aligned articles into contact with said die portion;
　retracting said male and female locating pins a distance sufficient to allow said cutting edges to contact said aligned articles.

11. The method of claim 10 further comprising the steps of:
　releasing said engagement of said male and female locating pins and said projecting deformations;
　returning said punch portion to its original position;
　aligning at least one next article with said cutting edges of said punch portion and said die edges of said die portions.

12. A method for producing thermoplastic articles formed on a sheet of material comprising the steps of:
　thermoforming a web of uncut thermoplastic articles from said sheet of material, said formed web consisting of a plurality of uncut thermoplastic articles and a plurality of projecting deformations surrounding said uncut thermoplastic articles;
　supplying said web of uncut thermoplastic articles to a trimming apparatus which comprises a movable punch portion and a die portion, said movable punch portion including a plurality of retractable male locating pins and at least one cutting edge, said plurality of retractable locating pins projecting beyond said cutting edge, said die portion including a plurality of retractable female locating pins and at least one die opening, said plurality of retractable female locating pins projecting beyond said at least one die opening;
　approximately aligning said thermoplastic articles with said at least one cutting edge of said movable punch portion and said at least one edge of said die portion;
　driving said male locating pins into contact with inner sides of said projecting deformations;
　exerting force on said inner sides of said projecting deformations to drive an outer side of said projecting deformations into contact with said female locating pins;
　holding said projecting deformations between said male and female locating pins to thereby align at least one of said thermoplastic articles between said at least one cutting edge and said at least one die edge prior to engagement of said web with either of said at least one cutting edge or said at least one die opening;
　retracting said female locating pin a distance sufficient to allow said at least one die edge to contact edges of at least one of said thermoplastic articles;
　retracting said male locating pin a distance sufficient to allow said at least one cutting edge to contact edges of at least one of said thermoplastic articles; and
　severing said thermoplastic articles from said web.

13. The method of claim 12 wherein the step of retracting said female locating pin further comprises the step of driving said movable male punch portion towards said die portion to force the retraction of said female locating pin.

14. The method of claim 13 wherein the step of retracting said male locating pin further comprises the step of driving said movable male punch portion towards said die portion to force the retraction of said male locating pin.

15. The method of claim 14 wherein said thermoforming step further includes forming a plurality of feed buttons on said web and wherein said aligning step further includes the steps of:
　engaging said feed buttons on said web; and
　indexing said web a specified distance to align said articles with said cutting edges and said die edges.

16. The method of claim 15 further comprising the step of rotating a paddle engaged with said feed buttons to index said web.

17. The method of claim 16 wherein said thermoforming step further includes forming at least one guide bar deformation on said web and wherein said supplying step further includes the steps of:
engaging said at least one guide bar deformation; and
guiding said web towards said trimming apparatus.

18. Apparatus for severing thermoplastic articles from a web having a plurality of uncut thermoplastic articles surrounded by a plurality of projecting deformation, comprising:
means for cutting said uncut thermoplastic articles from said web, said cutting means comprising a movable punch, at least one cutting edge attached to said movable punch, each of said cutting edges of similar shape and size of said uncut articles, and a stationary die having at least one opening of similar shape and size of said uncut articles;
means for supplying said web of uncut articles to said cutting means;
means for approximately aligning edges of said uncut articles with said cutting means; and
means for precisely locating edges of said uncut articles with said cutting means;
wherein said precise locating means further comprises retractable male locating means for engaging one side of said projecting deformations and retractable female locating means for engaging a second side of said projecting deformations prior to engagement of said web with said cutting means, said retractable male locating means for engaging one side of said projecting deformations is attached to and retractable within said movable punch and said retractable female locating means for engaging a second side of said projecting deformations is attached to and retractable within said stationary die.

19. Apparatus of claim 18 wherein said means for approximately aligning edges of said uncut articles with said cutting means further comprises:
means for engaging said web; and
means for indexing said web towards said cutting means such that said uncut article are approximately aligned with said cutting means.

20. Apparatus of claim 19 wherein said web further includes a plurality of feed buttons, said means for engaging said web further comprising at least one paddle which engages at least one of said feed buttons and said means for indexing said web further comprising rotating means connected to said paddle such that said paddle indexes said web towards said cutting means.

21. Apparatus of claim 18 wherein said male locating means further comprises a projecting tip of similar size and shape of said projecting deformations and said female locating means further comprises a hollowed out tip of similar size and shape of said projecting deformations.

22. Apparatus of claim 21 further comprising means for guiding said web toward said cutting means.

23. Apparatus of claim 22 wherein said web further includes at least one guide deformations, said means for guiding said web engaging said guide deformations while said web is advanced towards said cutting means.

24. Apparatus for severing thermoplastic articles from a web having a plurality of uncut thermoplastic articles surrounded by a plurality of projecting deformations, comprising:
a movable punch;
at least one cutting edge attached to and projecting from said movable punch, each of said at least one cutting edge of similar shape and size to one of said uncut thermoplastic articles;
at least one retractable male locating pin attached to said movable punch, each of said at least one retractable male locating pin projecting beyond said cutting edge;
a stationary trim die;
at least one die opening in said trim die, each of said at least one die opening being of similar shape and size to one of said uncut thermoplastic articles;
at least one retractable female locating pin attached to said trim die, each of said retractable female locating pins projecting beyond said at least one die openings;
wherein said projecting male locating pin first engages one side of said projecting deformation and drives said projecting deformation into said retractable female locating pin to align said uncut thermoplastic article with said cutting edge and said die opening prior to engagement of said web with either of said at least one cutting edge or said at least one die opening, said male and female retractable locating pins retracting when said cutting edge approaches said article to permit said cutting edge to engage said uncut article along its edge.

25. Apparatus of claim 24 wherein said web further includes a plurality of feed buttons and said apparatus for severing thermoplastic articles further includes at least one paddle for engaging said feed buttons and rotating means connected to said paddle to index said web towards said movable punch.

26. Apparatus of claim 24 wherein said retractable male locating pin further comprises a projecting tip of similar size and shape to said projecting deformation and said retractable female locating pin further comprises a hollowed out tip of similar size and shape of said projecting deformation.

* * * * *